US008947468B2

(12) United States Patent
Kim et al.

(10) Patent No.: US 8,947,468 B2
(45) Date of Patent: Feb. 3, 2015

(54) APPARATUS AND METHOD FOR ENHANCING READABILITY OF A CHARACTER

(75) Inventors: Jong-Man Kim, Ansan-si (KR); Kee-Hyon Park, Suwon-si (KR); Ji-Young Yi, Seoul (KR); Byung-Seok Min, Seoul (KR); Dong-Hoon Jang, Suwon-si (KR); Sung-Dae Cho, Yongin-si (KR); Hyun-Hee Park, Seoul (KR); Dong-Wook Kwon, Yongin-si (KR); Jin-Ho Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 885 days.

(21) Appl. No.: 13/039,857

(22) Filed: Mar. 3, 2011

(65) Prior Publication Data

US 2011/0216050 A1 Sep. 8, 2011

(30) Foreign Application Priority Data

Mar. 3, 2010 (KR) ........................ 10-2010-0019134

(51) Int. Cl.

| | |
|---|---|
| ***G06F 3/038*** | (2013.01) |
| ***G06K 9/34*** | (2006.01) |
| ***G06K 9/36*** | (2006.01) |
| ***G06K 9/00*** | (2006.01) |
| ***G09G 3/20*** | (2006.01) |

(52) U.S. Cl.
CPC ............ *G09G 3/20* (2013.01); *G09G 2340/145* (2013.01); *G09G 2360/144* (2013.01); *G09G 2360/16* (2013.01)
USPC ........... 345/690; 345/204; 345/207; 382/164; 382/168; 382/169

(58) Field of Classification Search
CPC ..... G09G 3/3688; G09G 3/3648; G09G 5/06; G09G 5/006; G09G 2310/027; G09G 2330/021; G06T 7/0081; G06T 7/408; G06K 9/4562
USPC ........... 345/204, 207, 690; 382/164, 168, 169
See application file for complete search history.

(56) References Cited

U.S. PATENT DOCUMENTS

| | | | | |
|---|---|---|---|---|
| 6,519,362 | B1 | 2/2003 | Cusmariu | |
| 2002/0113801 | A1* | 8/2002 | Reavy et al. | 345/589 |
| 2005/0037815 | A1* | 2/2005 | Besharat et al. | 455/566 |
| 2005/0117060 | A1 | 6/2005 | Minami | |

(Continued)

FOREIGN PATENT DOCUMENTS

| | | |
|---|---|---|
| CN | 1622605 | 6/2005 |
| CN | 101266777 | 9/2008 |

(Continued)

*Primary Examiner* — Kenneth Bukowski
(74) *Attorney, Agent, or Firm* — The Farrell Law Firm, P.C.

(57) ABSTRACT

A method and apparatus are provided for enhancing the readability of a character. The method includes determining ambient light of a mobile terminal and controlling background color and character color of a character image according to the determined ambient light. The method may further include performing an additional control according to the types of displays when controlling the background color and character color. Through this, it is possible to display a character image with enhanced visibility, while minimizing current consumption.

22 Claims, 8 Drawing Sheets
(3 of 8 Drawing Sheet(s) Filed in Color)

(56) References Cited

U.S. PATENT DOCUMENTS

| | | | | |
|---|---|---|---|---|
| 2007/0146356 | A1* | 6/2007 | Ladouceur | 345/207 |
| 2007/0236713 | A1* | 10/2007 | Ishiguchi | 358/1.9 |
| 2008/0225039 | A1 | 9/2008 | Oshita et al. | |
| 2009/0174725 | A1 | 7/2009 | Kim et al. | |
| 2010/0033457 | A1 | 2/2010 | Kim et al. | |
| 2010/0054694 | A1* | 3/2010 | Liu et al. | 386/54 |
| 2010/0201709 | A1 | 8/2010 | Yang et al. | |

FOREIGN PATENT DOCUMENTS

| | | |
|---|---|---|
| KR | 1020090076033 | 7/2009 |
| KR | 1020100090467 | 8/2010 |

* cited by examiner

APPARATUS AND METHOD FOR ENHANCING READABILITY OF A CHARACTER

PRIORITY

This application claims priority to an application filed in the Korean Industrial Property Office on Mar. 3, 2010, and assigned Serial No. 10-2010-0019134, the content of which is hereby incorporated by reference.

BACKGROUND OF THE INVENTION

1. Field of the Invention

The present invention relates generally to an apparatus and method for enhancing the readability of a character in a mobile terminal, and more particularly, to an apparatus and method for enhancing visibility while minimizing current consumption, when a user views the character on a screen of a mobile terminal.

2. Description of the Related Art

As the utilization of a slide out keyboard and/or touch screen display in a mobile terminal has increased, the screen size of the mobile terminal has also increased, and a display included in the mobile terminal is continually developing. More specifically, displays having excellent color reproduction ranges and contrast ratios are currently being developed and adopted, such as a Liquid Crystal Display (LCD) displays and an Active Matrix Organic Light-Emitting Diode (AMOLED) displays.

In a mobile terminal, because current consumption is a very important factor, a low-power driving is important. However, an LCD includes a backlight, and has constant current consumption at all times. That is, regardless of whether the lightness of a displayed image is high or low, current consumption is constant. In contrast, an AMOLED consumes different amounts of current depending on pixels of an input image. For example, the AMOLED has low current consumption when a dark image is displayed, and has high current consumption when a bright image is displayed. Further, when a bright image is displayed, there is a tendency that current consumption by an AMOLED is significantly higher than the current consumption by an LCD for the same image.

Accordingly, consumption and visibility are important factors that must be taken into consideration in displaying an image on a display of a mobile terminal. Especially, with the spread of contents such as an electronic book, wherein a user will read characters on a display of a mobile terminal for a longer time, a technology for providing a high visibility and reducing eye fatigue is important.

As described above, using an AMOLED, visibility decreases when an image is displayed darkly in order simply to reduce current consumption, while current consumption increases when an image is displayed brightly in order to increase visibility. Also, when using an LCD, when ambient light is brighter than the lightness of a display of a mobile terminal, visibility is lowered due to the limitation of the lightness of a backlight being is used as a light source.

Therefore, in order to display an image on a display of a mobile terminal, it is important to appropriately balance current consumption and visibility. In addition, because mobile terminals are equipped with different types of displays, such as an LCD, an AMOLED, etc., depending on products, and may be used in various environments, it is also important to develop a method for displaying an image to be suitable for a given ambient light and display type. For example, depending on whether a mobile terminal is used is inside or outdoors, the optimal visibility suitable for the different environments should be provided to the user. In addition, while visibility is important in displaying character-centered information content, such as an electronic book, eye fatigue is also an important factor for a user, when the user will read the character-center information content for a long time.

SUMMARY OF THE INVENTION

Accordingly, the present invention has been made to address at least some of the above-described problems occurring in the prior art, and to provide at least the advantages described below.

An aspect of the present invention is to provide an apparatus and method for enhancing the readability of a character to enhance visibility, while minimizing current consumption.

Another aspect of the present invention is to provide an apparatus and method for enhancing the readability of a character by taking ambient light into consideration.

In accordance with an aspect of the present invention, an apparatus is provided for enhancing readability of a character in a mobile terminal. The apparatus includes a histogram analysis unit for analyzing a histogram of a character image; a background and character division unit for dividing the character image into a background and a character, based on a result of analyzing the histogram, and determining R, G, and B values for each of the background and the character; a readability calculation unit for calculating a readability value through use of the R, G, and B values of the background and the R, G, and B values of the character, and determining if the calculated readability value is greater than or equal to a threshold value; a background color and character color determination unit for selecting the R, G, and B values of the background and the R, G, and B values of the character to be a background color and a character color, respectively, when the readability value is greater than or equal to the threshold value; and a display unit for displaying the character image configured with the background color and the character color.

In accordance with another aspect of the present invention, a method is provided for enhancing readability of a character in a mobile terminal including a display unit. The method includes analyzing a histogram of a character image; dividing the character image into a background and a character, based on a result of analyzing the histogram; determining R, G, and B values for each of the background and the character; calculating a readability value through use of the R, G, and B values of the background and the R, G, and B values of the character; determining if the readability value is greater than or equal to a threshold value; selecting the R, G, and B values of the background and the R, G, and B values of the character to be a background color and a character color, respectively, when the readability value is greater than or equal to the threshold value; and displaying the character image configured with the background color and the character color.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and advantages of the present invention will be more apparent from the following detailed description taken in conjunction with the accompanying drawings, in which.

DETAILED DESCRIPTION OF EMBODIMENTS OF THE INVENTION

Hereinafter, various embodiments of the present invention will be described in detail with reference to the accompanying drawings. In the below description, many particular items such as a detailed component device are shown, but these are given only for providing the general understanding of the present invention. It will be understood by those skilled in the art that various changes in form and detail may be made within the scope of the present invention. Further, in the following description of the present invention, a detailed description of known functions and configurations incorporated herein will be omitted when it may obscure the subject matter of the present invention.

In accordance with an embodiment of the present invention, a method for enhancing the readability of a character is provided. The method includes determining ambient light of a mobile terminal and controlling background color and character color of a character image according to the determined ambient light. An additional control according to a type of a display may also be performed when controlling the background color and the character color. Utilizing the method, it is possible to display a character image with enhanced visibility, while minimizing current consumption.

As described above, it is important to consider current consumption, as well as visibility, when controlling background color and character color. Therefore, before embodiments of the present invention are described, a relationship between current consumption and an amount of consumed current according to R, G, and B channels will be described.

Figure 1:
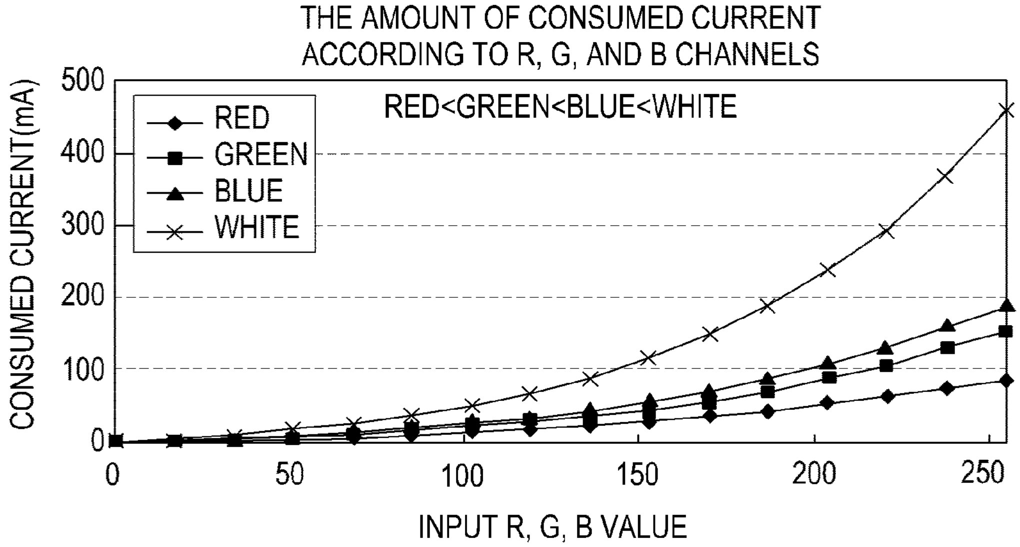
FIG. 1 is a graph illustrating a relationship between current consumption according to R, G, and B channels, according to an embodiment of the present invention.

FIG. 1 is a graph illustrating a relationship between current consumption according to R, G, and B channels, according to an embodiment of the present invention. Specifically, FIG. 1 illustrates current consumption of each channel, wherein it can be understood that, as a larger amount of red series color is used, current consumption decreases.

Referring to FIG. 1, current consumption reduces in order of white, blue, green, and red. Such a characteristic appears when a mobile terminal utilizes an AMOLED display, wherein use of a larger amount of bright white series colors increases current consumption while use of a larger amount of dark black series colors decreases current consumption. Additionally, due to the characteristics of an element, the current consumption of the AMOLED varies depending on the lightness of each R, G, and B channel, and even a combination of R, G, and B may exert a large influence on the lifetime of a battery. As described above, the current consumption of an AMOLED is determined according to colors and lightness for the respective pixels.

In contrast, because an LCD display uses a backlight, the LCD has constant current consumption, regardless of the lightness of a displayed image. Therefore, no matter which color is used for a character and/or a background, current consumption is not influenced. However, the current consumption of the LCD is connected with the intensity of the backlight, i.e., the current consumption increases as the lightness of the backlight increases. Further, when the intensity of backlight reduces, current consumption decreases, but the lightness of a displayed image becomes dark.

In addition, without regard to the types of displays, such as an AMOLED display, an LCD display, etc., a phenomenon occurs in which a display appears darker when exposed to too much ambient light, e.g., in an outdoor environment having strong sunlight.

In consideration of the characteristics described above, in accordance with an embodiment of the present invention a method is provided for reducing current consumption and simultaneously enhancing the visibility in displaying an image on a display, such as an AMOLED, an LCD, etc., of a mobile terminal.

Hereinafter, the term "mobile terminal' includes a notebook computer, a cellular phone, a Personal Communication Service (PCS) phone, a Personal Data Assistant (PDA), a camcorder, a game machine, etc., and the following description will be given on the assumption that the mobile terminal has a general configuration of the exampled devices.

Figure 2:
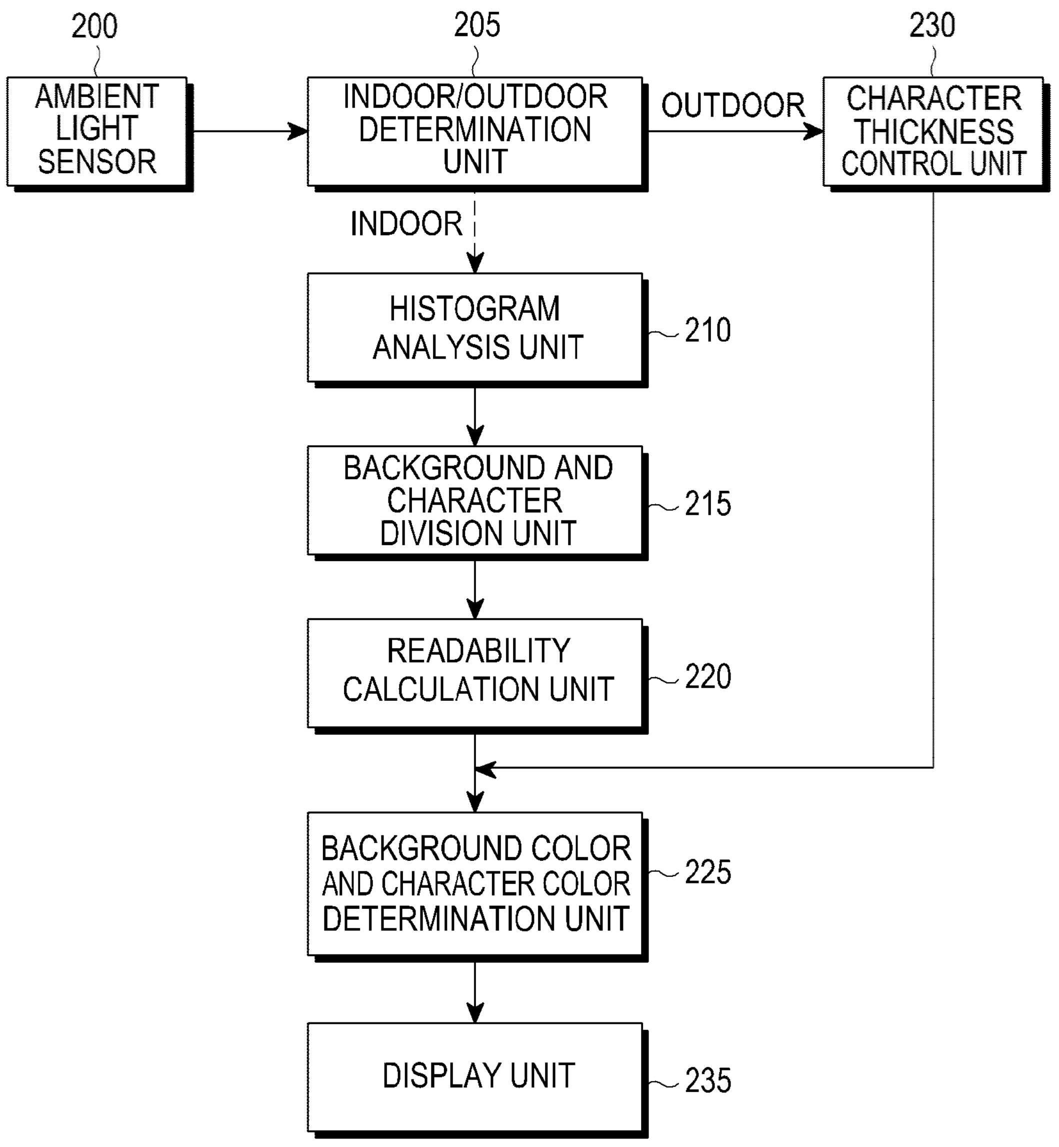
FIG. 2 is a block diagram illustrating a mobile terminal for enhancing the readability of a character according to an embodiment of the present invention.

FIG. 2 is a block diagram illustrating a mobile terminal according to an embodiment of the present invention.

Referring to FIG. 2, the mobile terminal includes an ambient light sensor 200, an indoor/outdoor determination unit 205, a histogram analysis unit 210, a background and character division unit 215, a readability calculation unit 220, a character thickness control unit 230, a background color and character color determination unit 225, and a display unit 235. Although components for displaying a character image according to the present invention are described with the aforementioned components as an example, the present invention is not limited thereto.

The ambient light sensor 200 measures the ambient light of the mobile terminal. Specifically, an ambient light sensor value is used to determine whether the mobile terminal is located in an outdoor environment or an indoor environment.

The indoor/outdoor determination unit 205 determines whether the ambient light sensor value belongs to a range representing an indoor environment or a range representing an outdoor environment. In an indoor environment, when the contrast ratio of a character image increases, the visibility of the character image is enhanced, but merely increasing only a contrast ratio increases eye fatigue.

As described above, when a user views a character image, such as an electronic book, for a long time, reduced eye fatigue is preferred. However, at the same time, it is also important to minimize current consumption. Further, in an outdoor environment, because ambient light is high, it is important to control a phenomenon in which a display is dimly seen due to eye light adaptation.

When determining that the mobile terminal is located indoors, the indoor/outdoor determination unit 205 provides a character image to the histogram analysis unit 210. The histogram analysis unit 210 generates and analyzes a histogram of the input character image. Generally, for a character image, such as an electronic book, color distribution is generally classified into a color corresponding to a background and a color corresponding to a character. Therefore, the color distribution can be found through a histogram analysis.

The background and character division unit 215 divides the character image into a character and a background using a result of the histogram analysis. The background and character division unit 215 determines the respective R, G, and B values of the background and the character. That is, the background and character division unit 215 determines R, G, and B values corresponding to the background, and R, G, and B values corresponding to the character, based on the color distribution histogram.

Because a background occupies most of a character image, the background and character division unit 215 determines that a color group including a smaller number of pixels of the classified two color groups corresponds to a character, and a color group including a greater number of pixels corresponds to a background, thereby dividing a character image into a character and a background. Thereafter, the background and character division unit 215 stores the R, G, and B values of the background, and the R, G, and B values of the character.

The readability calculation unit 220 digitizes the readability of a character image to calculate a readability value, and compares the calculated readability value with a threshold value. When the calculated readability value is less than the threshold value, the readability calculation unit 220 changes a combination of the background color R, G, and B and the character color R, G, and B and recalculates a readability value of the character image using the changed combination of the background color R, G, and B and the character color R, G, and B. While changing a combination of the background color R, G, and B and the character color R, G, and B until a calculated readability value is greater than the threshold value, as described above, the readability calculation unit 220 finds a combination of the background color R, G, and B and the character color R, G, and B, which results in a calculated readability value that is greater than the threshold value.

When a combination of the background color R, G, and B and the character color R, G, and B results in a calculated readability value that is greater than the threshold value, the background color and character color determination unit 225 determines the background color R, G, and B to be a background color, and determines the character color R, G, and B to be a character color.

Additionally, when the display unit 235 is an AMOLED, the background color and the character color are finally determined by the aforementioned method. However, when the display unit 235 is an LCD, the background color and the character color determination unit 225 decreases an intensity of a backlight in order to reduce current consumption, and compensates for pixel lightness, which is reduced by decreasing the intensity of the backlight.

The display unit 235 displays a character image configured with the background color and the character color, which have been determined by the background color and character color determination unit 225. For the LCD, the background color and character color determination unit 225 performs additional processing.

According to an embodiment of the present invention, in order to determine how much the readability is enhanced when background color and character color have been controlled, a condition for determining readability is digitalized. Specifically, a readability value, which is obtained by digitalizing of readability of a character image, is compared with a threshold value, and when the readability value is greater than the threshold value, the mobile terminal determines that the corresponding readability satisfies a visibility demanded by the user. Here, the threshold value may change according to the selection of the user, a service provider, a terminal manufacturing company, etc.

According to an embodiment of the present invention, in digitalizing readability, at least one factor among visibility, fatigue, and current consumption is used. As visibility has a greater value, readability becomes better.

In addition, it is preferred that fatigue is low in terms of the user, and that current consumption is small in terms of the mobile terminal. On the basis of these conditions, it can be understood that the value of readability increases as the value of visibility increases, and as the value of fatigue and current consumption decrease, which is expressed in Equation (1).

$$\text{Readibility}=V\times(1-F)^{r1}\times(1-\text{Power})^{r2} \quad (1)$$

In Equation (1), V represents visibility, F represents fatigue, and Power represents current consumption. In addition, r1 and r2 are weights for current consumption, and have values close to zero in an outdoor environment. Here, V can be obtained by Equation (2) below.

$$V=\text{alpha}\times\sqrt{(L1-L2)^2+(a1-a2)^2+(b1-b2)^2} \quad (2)$$

Figure 3:
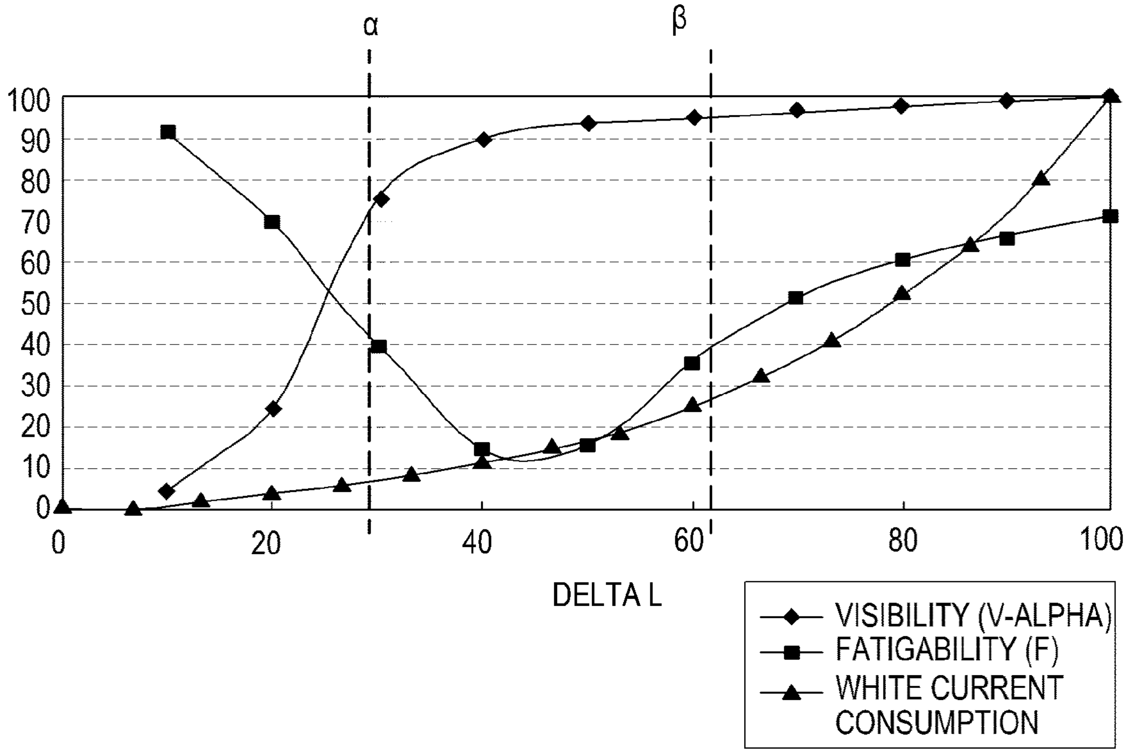
FIG. 3 is a graph illustrating a relationship between visibility, fatigability, and current consumption, according to an embodiment of the present invention.

In Equation (2), alpha represents a value of a visibility (V-alpha) curve, as illustrated in FIG. 3, L1 represents lightness of a character area, L2 represents lightness of a background area, a1 and b1 represent color coordinates of the character area, and a2 and b2 represent color coordinates of the background area.

As described above, visibility V is connected with lightness, hue, and chroma contrasts. Specifically, in order to achieve high visibility, high contrasts are utilized, wherein the hue and chroma contrasts, as well as the lightness contrast, are important factors. There are various methods for converting each of the R, G, and B values into a lightness/chroma/hue space in order to calculate the visibility "V. For example, one method converts each of the R, G, and B values into lightness, chroma, and hue of an LAB color space. Also, in terms of the lightness contrast, a weight function obtained by a visual experiment may also be used.

The fatigability F can be obtained using a function graph, wherein the fatigability value increases at a low contrast level while the fatigability value increases at a high contrast level. Generally, when contrast between a character and a background has a low value, it is difficult for the user to distinguish and see the character and the background, increasing the chance of user eye fatigue. In addition, when contrast between a character and a background has too high a value, this also increases eye fatigue.

FIG. 3 is a graph illustrating a relation between visibility, fatigue, and current consumption based on a contrast ratio, according to an embodiment of the present invention. In FIG. 3, a lateral axis represents a contrast ratio.

Referring to FIG. 3, in a range from contrast ratio α to contrast ratio β, visibility is high, fatigue is low, and current consumption is low. Because the visibility and fatigue may vary depending on brightness, the shape of the graph for visibility and fatigue illustrated in FIG. 3 may vary depending on a result of measurement and/or test.

The current consumption Power in Equation (1) may be obtained by Equation (3).

$$\text{Power} = (1 - \text{fg\_portion}) \times \begin{pmatrix} \text{current\_R} \\ \text{current\_G} \\ \text{current\_B} \end{pmatrix} \times \begin{pmatrix} \text{bg\_R} \\ \text{bg\_G} \\ \text{bg\_B} \end{pmatrix} + \text{fg\_portion} \times \begin{pmatrix} \text{current\_R} \\ \text{current\_G} \\ \text{current\_B} \end{pmatrix} \times \begin{pmatrix} \text{fg\_R} \\ \text{fg\_G} \\ \text{fg\_B} \end{pmatrix} \quad (3)$$

In Equation (3), fg_portion represents a total number of pixels, fg_R, fg_G, and fg_B represent R, G, and B values corresponding to a character area, respectively, and bg_R, bg_G, and bg_B represent R, G, and B values corresponding to a background area, respectively. Further, current_R, current_G, and current_B represent current consumption rates according to R, G, and B channels, respectively.

In order to calculate current consumption Power, the fact that the degrees of current consumption are different depending on R, G, and B channels should be taken into consideration. Therefore, as illustrated in Equation 3, the respective current consumption rates are substituted for the current_R, current_G, and current_B. Here, because the difference of current consumption occurs depending on the number of pixels for a character and the number of pixels for a background, reference is made to the number of letters counted while a histogram is generated. For reference, in an outdoor environment, because the fatigue and current consumption elements are more important than the visibility element, the weights are reduced such that the value of r1 and r2 are set to values close to zero.

When it is determined that the mobile terminal is located outdoors, the indoor/outdoor determination unit 205 provides the character image to the character thickness control unit 230. The character thickness control unit 230 controls the character area of a character image to have a predetermined thickness. In an outdoor environment, the effect of sunlight and visual adaptation make it difficult to secure the same visibility as that obtained indoors, although the maximum lightness and contrast are applied. Accordingly, when the user sees a character image through the display unit 235 in an outdoor environment greater than or equal to 500 lux, the character image is seen as dark, and the visibility becomes low. For this reason, the character thickness control unit 230 changes the character area of a character image to have a predetermined thickness.

Figure 4:
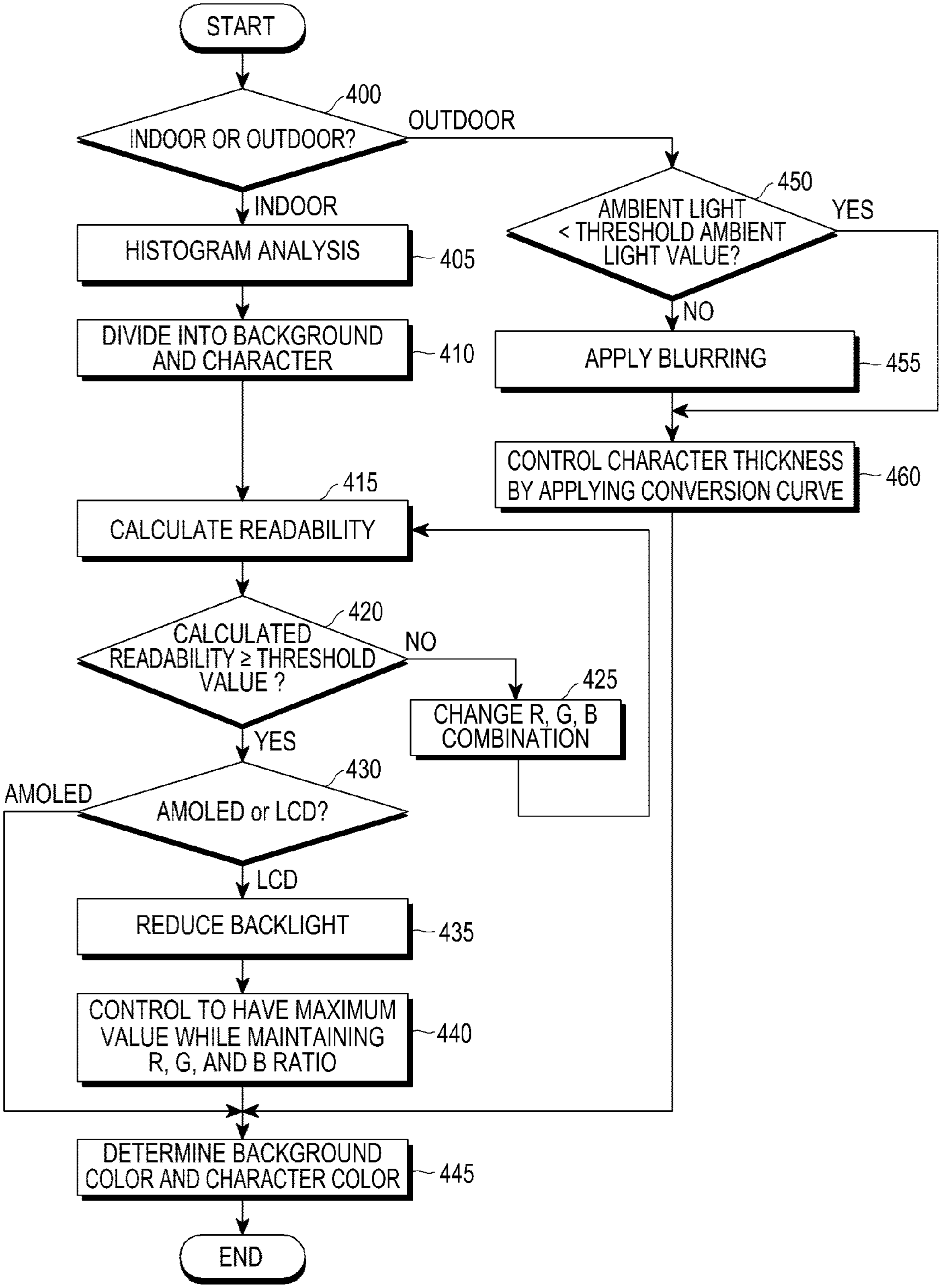
FIG. 4 is a flowchart illustrating a method for enhancing the readability of a character in a mobile terminal according to an embodiment of the present invention.

FIG. 4 is a flowchart illustrating a method for enhancing the readability of a character in a mobile terminal according to an embodiment of the present invention.

Referring to FIG. 4, in step 400, the mobile terminal determines whether the mobile terminal is located indoors or outdoors. As described above, the mobile terminal uses an ambient light sensor value. When the ambient light sensor value represents that the mobile terminal is located indoors, the mobile terminal analyzes a histogram of a character image in step 405. For a character image, when a histogram is generated, the histogram distribution is roughly divided into a group corresponding to a background and a group corresponding to a character. Using a result of such a histogram analysis, the mobile terminal can divide the character image into a background and a character in step 410. Here, R, G, and B of the background, and R, G, and B of the character are stored.

In step 415, the mobile terminal calculates readability of the background and the character. Specifically, the mobile terminal first calculates readability using the stored background R, G, and B, and character R, G, and B. The calculation of readability can be obtained using Equations (1) to (3), as described above. Thereafter, in step 420, it is determined if a combination of the stored background R, G, and B, and character R, G, and B satisfies a condition for readability, i.e., the mobile terminal determines if the calculated readability value is greater than or equal to a threshold value.

When it is determined that the calculated readability value is less than a threshold value in step 420, i.e., the condition for readability is not satisfied, the mobile terminal changes the respective R, G, and B combinations of the background R, G, and B, and character R, G, and B in step 425. Thereafter, the mobile terminal re-calculates readability through the use of the changed background R, G, and B, and the changed character R, G, and B in step 415.

As described above, a change of the respective R, G, and B combinations is repeatedly performed until a calculated readability value greater than or equal to the threshold value is obtained. When a readability value is calculated through such a repetitious procedure, it is possible to obtain a result restricted within a predetermined range (e.g. a range from $\alpha$ to $\beta$), as illustrated in FIG. 3. As a result of a simulation, it has been confirmed that, when a character image has a lightness contrast within the predetermined range, fatigue is low and visibility is high, although the user views the character image for a long time.

For a character image that is configured with a bright-colored character on a dark-colored background, the aforementioned readability calculation procedure is applied. An example of such a character image is illustrated by reference number 600 in FIG. 6.

Figure 6:
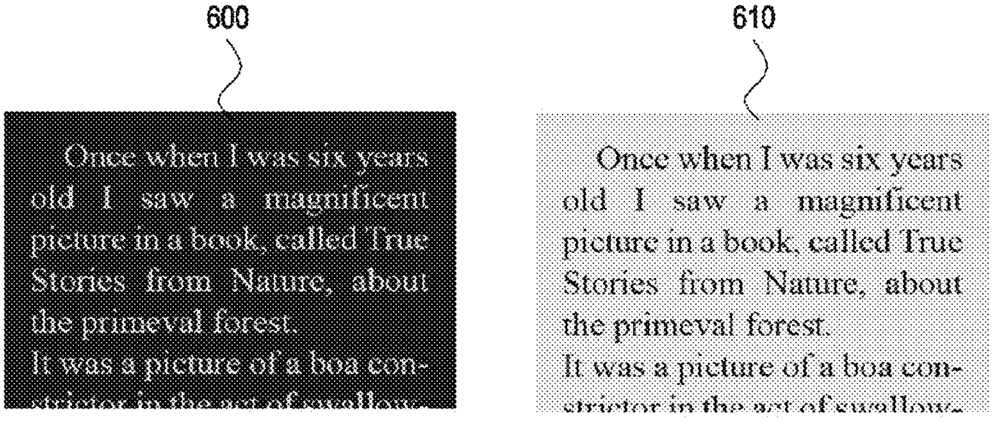
FIG. 6 illustrates a character image displayed on a display of a mobile terminal according to an embodiment of the present invention.

FIG. 6 illustrates a character image displayed on a display of a mobile terminal according to an embodiment of the present invention.

Generally, for a black background, most mobile terminals use a white character. However, according to an embodiment of the present invention, for a black background, a yellow-toned character, not a white character, is used in combination with the black background.

Referring to FIG. 6, reference number 600 in FIG. 6 illustrates a character image in which the background R, G, and B are 33, 32, and 30, respectively, and the character R, G, and B are 194, 184, and 151, respectively.

However, when a character image is configured with a dark character on a bright background, the current consumption may increase because the background, which occupies most of the character image, is bright. This is because the number of pixels for a background is relatively larger than the number of pixels for a character. Therefore, while most mobile terminals use a black character and a white background, a mobile terminal according to an embodiment of the present invention changes the background color and the character color in order to take current consumption into consideration.

According to results of current measurements and visibility tests for various background colors, it has been determined that the more values of a red series the character image has, the lower the current consumption is. Therefore, a white background is changed to a background, which is more yellow-toned, as illustrated by reference number 610 in FIG. 6, and a character is displayed with a character color combined with the background.

Reference number 610 in FIG. 6 illustrates a character image in which the background color is yellow-toned while the lightness of a blue channel is reduced. In this case, because a yellow-toned color, instead of white, is used as a background color, the user can obtain a comfortable feeling, such as reading a character printed on a paper.

Referring back to FIG. 4, when the calculated readability value is greater than or equal to the threshold value in step 420, the mobile terminal determines whether the type of the display is an AMOLED or an LCD in step 430. When a character image having a readability value greater than or equal to the threshold value is displayed on an AMOLED, a displayed character image has a high visibility and reduces eye fatigue, while minimizing current consumption.

Therefore, when the type of the display is an AMOLED, the mobile terminal selects the background R, G, and B, and the character R, G, and B, which satisfy the readability condition, as the background color and the character color, respectively, in step 445, and displays a character image configured with the background color and the character color.

When the display is an LCD, the mobile terminal reduces backlight in step 435, and controls the R, G, and B ratios for the background and the character to have maximum values, while maintaining the R, G, and B ratios, in step 440. Differently from an AMOLED, with the LCD, it is important to reduce the backlight in order to reduce current consumption. However, when the backlight is reduced, the lightness of display becomes darker. Therefore, in order to compensate for the lightness of the display, step 440 is additionally performed.

In order to compensate for the lightness of display, a method of increasing a pixel value may be used. For the LCD, although the background R, G, and B, and the character R, G, and B, which are greater than the threshold value, have already been determined, the pixel lightness becomes lower than the maximum lightness. Therefore, a procedure for controlling the pixel lightness is utilized, which will be described in more detail with reference to FIG. 5.

Figure 5:
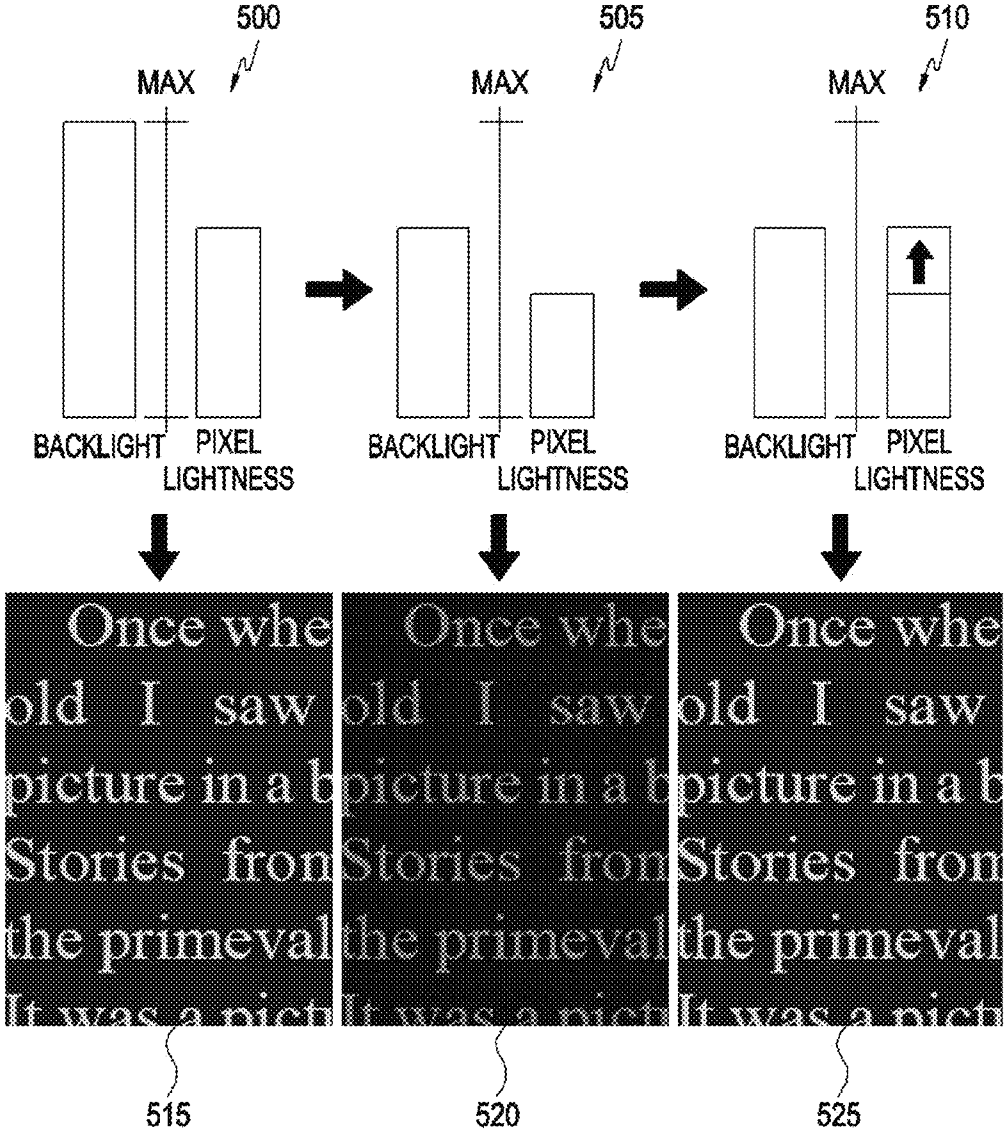
FIG. 5 illustrates an additional processing scheme for reducing power consumption when an LCD display is used according to an embodiment of the present invention.

FIG. 5 illustrates an additional processing scheme for reducing power consumption when an LCD display is used according to an embodiment of the present invention. Specifically, FIG. 5 illustrates an operation corresponding to steps 435 and 440 of FIG. 4.

Referring to FIG. 5, reference number 500 illustrates a case in which a backlight is driven at maximum. For reference number 500, because the pixel lightness is lower than the backlight, a character image is displayed as illustrated by reference number 515.

If the backlight is reduced as illustrated by reference number 505 in order to reduce current consumption, the pixel lightness is lowered. For reference number 505, the character image is displayed as illustrated by reference number 520. That is, it can be understood that, when the backlight is reduced, the entire lightness of the character image indicated by reference number 520 becomes darker, as compared with the character image indicated by reference number 515. Therefore, according to an embodiment of the present invention, an additional method for increasing the pixel lightness, which has been reduced according to reduction of the backlight, is proposed, as illustrated by reference number 510.

The method for increasing the pixel lightness may be implemented using Equation (4) below.

$$R'=R/RGB_{max}\times 255$$

$$G'=G/RGB_{max}\times 255$$

$$B'=B/RGB_{max}\times 255 \quad (4)$$

In Equation (4), $RGB_{max}$ represents a maximum value of R, G, and B channels.

Because the entire character image becomes dark, as illustrated in the character image indicated by reference number 520, the same lightness as the calculated lightness is set to be generated by allowing at least one channel to have the maximum lightness (255) while maintaining a ratio of R, G, and B, as shown in Equation (4). Through such an additional procedure, the character image is displayed as illustrated by reference number 525. Accordingly, it can be understood that, although the backlight has been reduced, the character image indicated by reference number 525 has little difference from the character image indicated by reference number 515.

Referring again to FIG. 4, when the mobile terminal determines that the mobile terminal is located outdoors in step 400, the mobile terminal determines if an ambient light value is greater than or equal to a threshold ambient light value in step 450. When the ambient light value is less than the threshold ambient light value, the mobile terminal controls a character thickness by applying a conversion curve in step 460. However, when the ambient light value is greater than or equal to the threshold ambient light value, the mobile terminal proceeds to step 455, where the mobile terminal applies a blurring to the character image, and then performs step 460. Specifically, when the user sees a character image in an outdoor environment in which the ambient light value is greater than or equal to 5000 lux, the character image is seen as dark, and visibility becomes low. For this reason, the character in the character area of the character image is changed to have a predetermined thickness.

Figure 8:
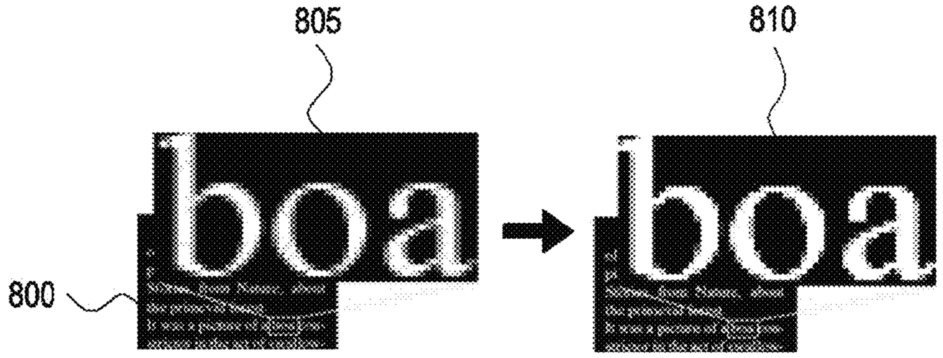
FIG. 8 illustrates a conversion curve scheme according to an embodiment of the present invention.

FIG. 8 illustrates a conversion curve scheme according to an embodiment of the present invention. For example, referring to FIG. 8, states of characters, before and after a character thickness control, will be described.

Figure 7:
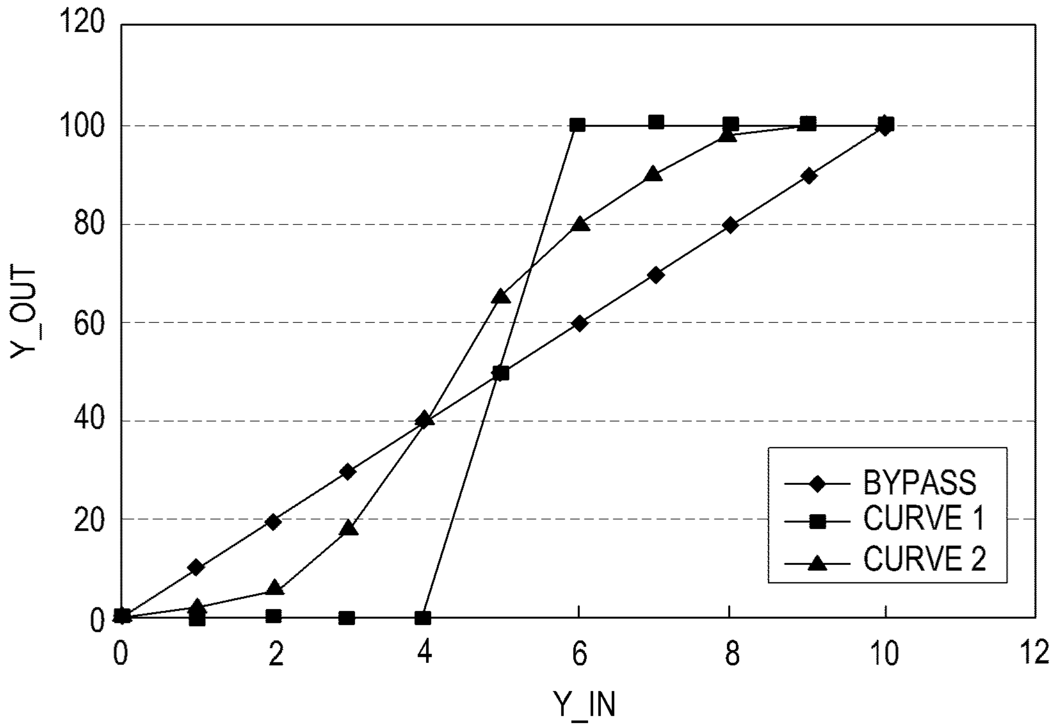
FIG. 7 is a graph illustrating a conversion curve based on input lightness, according to an embodiment of the present invention.

Referring to FIG. 8, the reference number 805 represents a partial character image obtained by enlarging a part of a character image before a character thickness control, and reference number 810 represents a partial character image obtained by enlarging the part of the character image after the character thickness control. When a lightness conversion curve, as illustrated in FIG. 7, is applied, the character thickness as illustrated in the partial character image 805 becomes thick, as illustrated in the partial character image 810. That is, when the lightness conversion curve is used, the character area becomes more distinct because the contrast increases, and the character thickness becomes wider because pixel values of a middle tone are changed to a maximum value, increasing visibility.

In this case, if only the thickness of a character increases, an aliasing phenomenon may occur. Therefore, in order to remove such a phenomenon, pixel values of a middle tone, including an effect such as an anti-aliasing, may be added so that a changing operation can be smoothly connected and performed. Also, when the ambient light value of an outdoor environment is greater than or equal to a threshold ambient light value (e.g. one-hundred thousand lux), the character thickness is set to be thicker. In this case, blurring is performed on a character area, as described in step 455, thereby spreading the color of the character area to the peripheral thereof.

Figure 9:
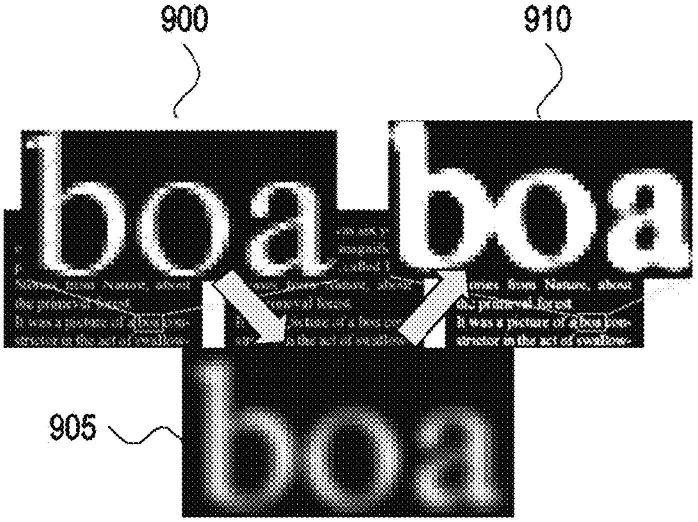
FIG. 9 illustrates a blurring scheme according to an embodiment of the present invention.

FIG. 9 illustrates a blurring scheme according to an embodiment of the present invention.

For example, referring to FIG. 9, reference number 900 illustrates a partial character image obtained by enlarging a part of a character image before blurring, and a partial character image indicated by reference number 905 is obtained by applying the blurring. When a light conversion curve as illustrates in FIG. 7 is applied to a partial character image 905, the character thickness becomes thicker and simultaneously visibility is enhanced, as illustrates in a partial character image 910.

While a method for controlling a character thickness has been described above as an example of a method for enhancing visibility in an outdoor environment, a method considering the that visibility increases when colors in a complementary color relation is used may be used. For example, in order to increase visibility, colors in a complementary color relation may be selected for background and character colors.

According to the above-described embodiments of the present invention, when a mobile terminal displays a character-centered image, it is possible to increase the visibility of the image according to indoors and outdoors while minimizing current consumption. Further, because the visibility of a character image in a mobile terminal increases, and simultaneously the current consumption is minimized, an apparatus and method according to the present invention are effective when the mobile terminal is used for a long time.

It is apparent that the method for enhancing readability of a character according to the present invention can be achieved in the form of hardware, software (i.e. a program), or a combination thereof. Such a program may be stored in a volatile or non-volatile recording medium, which can be read by machine such as a computer. The computer-readable recording medium storing the program causing a processor to execute the method. The recording medium may be a storage device, such as a Read-Only Memory (ROM), a memory, such as a Random Access Memory (RAM), a memory chip and an integrated chip, or an optical or magnetic recording medium, such as a Compact Disk (CD), a Digital Versatile Disk (DVD), a magnetic disk and a magnetic tape. Namely, the edge-adaptive interpolation and noise filtering method of the present invention may be implemented in the form of a program including codes for achieving the method.

While the present invention has been shown and described with reference to certain embodiments thereof, it will be understood by those skilled in the art that various changes in form and details may be made therein without departing from the spirit and scope of the present invention as defined by the appended claims. Accordingly, the scope of the present invention is not defined by the above-described embodiments, but by the claims and any equivalents thereof.

What is claimed is:

1. An apparatus for enhancing readability of a character in a mobile terminal, the apparatus comprising:

a background and character division unit configured for dividing a character image into a background and a character, and determining R, G, and B values for each of the background and the character;

a readability calculation unit configured for calculating a readability value using the R, G, and B values of the background and the R, G, and B values of the character, and determining if the readability value is greater than or equal to a threshold value;

a background color and character color determination unit configured for:

determining whether a display unit includes a first display having light emitting diodes or the display unit includes a second display having a backlight;

selecting the R, G, and B values of the background and the R, G, and B values of the character as a background color and a character color, respectively, based on determining that the display unit includes the first display when the readability value is greater than or equal to the threshold value; and reducing lightness of the backlight, increasing the R, G, and B values of the character while maintaining a ratio of the R, G, and B values for the character, and selecting the R, G, and B values of the background and the increased R, G, and B values of the character as a background color and a character color, respectively, based on determining that the display unit includes the second display when the readability value is greater than or equal to the threshold value;

and the display unit configured for displaying a character image configured with the background color and the character color.

2. The apparatus of claim 1, wherein the readability calculation unit repeatedly calculates the readability value while changing the R, G, and B values of the background and the R, G, and B values of the character until the calculated readability value is greater than or equal to the threshold value.

3. The apparatus of claim 1, wherein the first display comprises an Active Matrix Organic Light-Emitting Diode (AMOLED), and the second display comprises a Liquid Crystal Display (LCD).

4. The apparatus of claim 1, further comprising:

an ambient light sensor for measuring ambient light of the mobile terminal; and a character thickness control unit for controlling a character thickness of the character image to be thickened, when an ambient light sensor value measured by the ambient light sensor is greater than or equal to a threshold ambient light value, wherein the display unit is configured for displaying the character image configured with the background color, the character color and the character thickness.

5. The apparatus of claim 4, further comprising:

an indoor/outdoor determination unit for determining whether the mobile terminal is located indoors or outdoors, based on an ambient light sensor value measured by the ambient light sensor.

6. The apparatus of claim 5, wherein the indoor/outdoor determination unit provides the character image to the character thickness control unit, when determining that the mobile terminal is located outdoors, based on the ambient light sensor value.

7. The apparatus of claim 4, wherein the character thickness control unit applies blurring to the character of the character image, and then controls the character thickness to be thickened.

8. The apparatus of claim 7, wherein the readability calculation unit calculates the readability value based on visibility, fatigue, and power consumption in such a manner that the visibility increases and the fatigue decreases.

9. A method for enhancing readability of a character in a mobile terminal including a display unit, the method comprising the steps of:

dividing a character image into a background and a character;

determining R, G, and B values for each of the background and the character;

calculating a readability value using the R, G, and B values of the background and the R, G, and B values of the character;

determining if the calculated readability value is greater than or equal to a threshold value;

determining whether the display unit includes a first display having light emitting diodes or the display unit includes a second display having a backlight;

selecting the R, G, and B values of the background and the R, G, and B values of the character as a background color and a character color, respectively, based on determining that the display unit includes the first display when the readability value is greater than or equal to the threshold value;

reducing lightness of the backlight, increasing the R, G, and B values of the character while maintaining a ratio of the R, G, and B values for the character, and selecting the R, G, and B values of the background and the increased R, G, and B values of the character as a background color and a character color, respectively, based on determining that the display unit includes the second display when the readability value is greater than or equal to the threshold value;

and displaying, on the display unit, the character image configured with the background color and the character color.

10. The method of claim 9, further comprising:

changing the R, G, and B values of the background and the R, G, and B values of the character and recalculating the readability value, until a recalculated readability value is greater than or equal to the threshold value, when the readability value is not greater than or equal to the threshold value.

11. The method of claim 9, wherein the first display comprises an Active Matrix Organic Light-Emitting Diode (AMOLED), and the second display comprises a Liquid Crystal Display (LCD).

12. The method of claim 9, further comprising:

measuring ambient light of the mobile terminal; and controlling a character thickness of the character image to be thickened, when an ambient light sensor value measured by the ambient light sensor is greater than or equal to a threshold ambient light value;

wherein the character image configured with the background color, the character color and the character thickness is displayed on the display unit.

13. The method of claim 12, further comprising:

determining whether the mobile terminal is located indoors or outdoors, based on the measured ambient light sensor value.

14. The method of claim 13, wherein controlling the character thickness of the character image comprises the steps of:

applying blurring to the character of the character image, when the measured ambient light sensor value is greater than or equal to the threshold ambient light value; and controlling the character thickness to be thickened.

15. A non-transitory computer-readable recording medium storing a program causing a processor to execute a method for enhancing readability of a character in a mobile terminal including a display unit, comprising:

dividing a character image into a background and a character;

determining R, G, and B values for each of the background and the character;

calculating a readability value using the R, G, and B values of the background and the R, G, and B values of the character;

determining if the calculated readability value is greater than or equal to a threshold value;

determining whether the display unit includes a first display having light emitting diodes or the display unit includes a second display having a backlight;

selecting the R, G, and B values of the background and the R, G, and B values of the character as a background color and a character color, respectively, based on determining that the display unit includes the first display when the readability value is greater than or equal to the threshold value;

reducing lightness of the backlight, increasing the R, G, and B values of the character while maintaining a ratio of the R, G, and B values for the character, and selecting the R, G, and B values of the background and the increased R, G, and B values of the character as a background color and a character color, respectively, based on determining that the display unit includes the second display when the readability value is greater than or equal to the threshold value;

and displaying, on the display unit, the character image configured with the background color, the character color.

16. A method for displaying text on a display unit of a mobile terminal, comprising:

dividing a text image into a background and a character;

calculating a readability value of the text image based on power consumption due to displaying the text image on the display unit and at least one of visibility and fatigue;

determining if the calculated readability value is greater than or equal to a threshold value;

determining whether the display unit includes a first display having light emitting diodes or the display unit includes a second display having a backlight;

selecting R, G, and B values of the background and R, G, and B values of the character as a background color and a character color, respectively, based on determining that the display unit includes the first display when the readability value is greater than or equal to the threshold value;

reducing lightness of the backlight, increasing the R, G, and B values of the character while maintaining a ratio of the R, G, and B values for the character, and selecting the R, G, and B values of the background and the increased R, G, and B values of the character as a background color and a character color, respectively, based on determining that the display unit includes the second display when the readability value is greater than or equal to the threshold value; and if the calculated readability value is not greater than or equal to the threshold value, performing one or more color-changing iterations, where each of the one or more color-changing iterations comprises:

changing at least one of a Red (R), Green (G), or Blue (B) value of the character, and/or a R, G, or B value of the background;

calculating a readability value of the color-changed text image;

determining if the calculated readability value of the color-changed text image is greater than or equal to the threshold value; and if the calculated readability value of the color-changed text image is not greater than or equal to the threshold value, performing another iteration.

17. The method of claim 16, further comprising:

when the calculated readability value is greater than or equal to the threshold value, displaying the text image.

18. The method of claim 16, wherein the readability value is based on the power consumption for displaying the text image, the visibility, and the fatigue.

19. The method of claim 18, wherein the readability value increases when the visibility increases and/or when the fatigue or the power consumption decreases.

20. The method of claim 16, further comprising:

selecting the threshold value.

21. The method of claim 16, wherein the first display comprises an Active Matrix Organic Light-Emitting Diode (AMOLED), and the second display comprises a Liquid Crystal Display (LCD).

22. The method of claim 16, further comprising, when the mobile terminal is located outside:

determining whether an ambient light value is greater than or equal to a threshold ambient light value;

when ambient light value is greater than or equal to the threshold ambient light value, applying blurring to the character; and controlling thickness of the character.

* * * * *